Patented Oct. 27, 1936

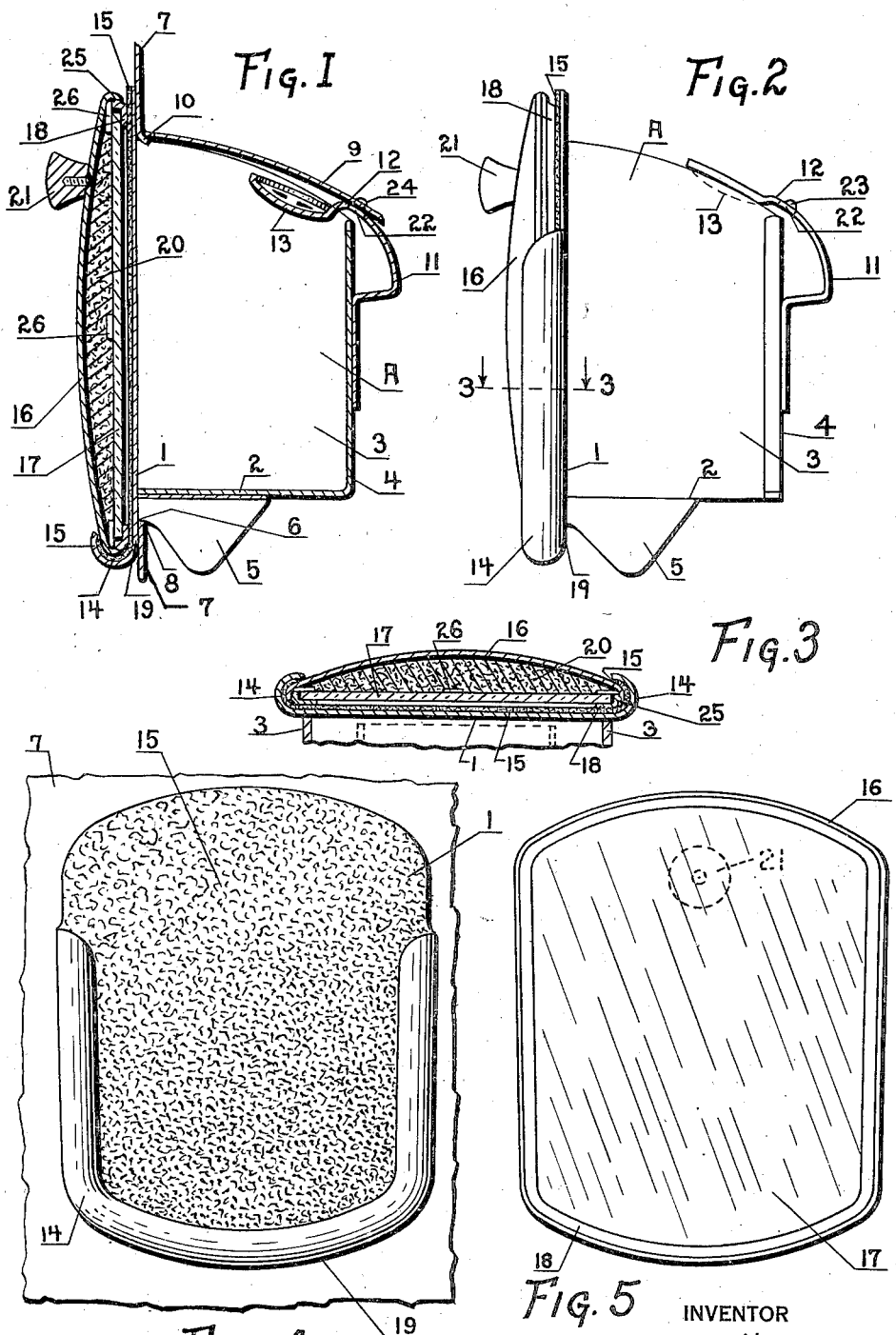

2,058,845

UNITED STATES PATENT OFFICE 2,058,845

ASH RECEIVER

John Visser, Grand Rapids, Mich., assignor, by mesne assignments, to F. L. Jacobs Company, Detroit, Mich., a corporation of Michigan Application May 18, 1935, Serial No. 22,210

5 Claims. (Cl. 206—19.5)

This invention relates to improvements in ash receivers adapted to be mounted on the instrument panel or other interior wall of an automobile for receiving ashes from cigars and cigarettes, and for the deposit of the unused portion of the same therein.

It has heretofore been impossible for occupants of automobiles to readily get access to a mirror without having to open a hand bag, suitcase, vanity case or other similar article. Hence, I have provided a means for readily obtaining a mirror, mounted in such a way that it can be easily used without breaking and of such size that the movements of the automobile will not interfere with its use.

The principal object of this invention is to provide an ash receiver with a removable member comprising a decorative panel and a mirror.

Another object of this invention is to so mount the ornamental panel and mirror member that when used with a concealed type ash receiver it may be used for opening and closing the ash receiver.

Another object of the invention is to so mount the ornamental panel and mirror member upon the ash receiver that it may be removed and replaced without damage to the finish of the ornamental panel.

Another object of the invention is to protect the front of the mirror from damage when being removed from and replaced upon the ash receiver.

Another object of the invention is to detachably mount the mirror upon the back of an ornamental panel so that the mirror may be readily separated from the panel if either becomes damaged.

Another object of the invention is to prevent the mirror and panel member from becoming disconnected from the receiver when the receiver is removed for emptying the contents thereof.

Another object of the invention is to mount the mirror in a protecting frame from which it may be readily removed after the frame and mirror have been detached from the ornamental panel.

These and other objects and advantages attainable with the present improvement, will be apparent in the course of the following description.

A clear conception of one embodiment of the invention and of the operation of one form of a receiver constructed in accordance therewith, may be had by reference to the drawing accompanying and forming a part of this specification in which like characters designate the same or similar parts in the various vews.

Figure 1 is a vertical section through a concealed type of ash receiver provided with a removable ornamental panel and mirror member.

Figure 2 is a side view of the ash receiver of Figure 1 after removal of the receiver from the instrument panel for emptying.

Figure 3 is a plan view of a horizontal section of the front wall of the ash receiver with the ornamental panel and mirror in place on the line 3—3 of Figure 2 looking in the direction of the arrows.

Figure 4 is a view showing the front wall of the receiver after removal of the ornamental panel and mirror member.

Figure 5 is a view showing the mirror side of the panel and mirror member after removal from the ash receiver.

Referring to the drawing in which like parts are designated by the same numerals in the several views, the ash receiver body comprises an open top box, generally designated by the letter "A", formed from sheet metal stampings having a front wall 1, a bottom wall 2, two side walls 3 and a rear wall 4. Rigidly attached to the bottom wall 4, by spot welding or otherwise, is a hinge part having a pair of depending portions 5. The box A, except for the front wall 1, is inserted within an opening 6 in an instrument panel 7 with the hinge portions 5 mounted on the lower edge 8 of the opening. The lower end 19 of the front wall 1 extends beyond the lower edge 8 of opening 6 in the panel and acts to assist the portions 5 so that the box A may be rocked into and out of the opening 6 about the lower edge 8. By bending back a portion of the material which is struck when forming the opening 6 in the instrument panel a cover 9 is formed for the box A of the ash receiver when it is in its closed position.

Attached to the rear wall 4 of the box A is a spring member 11, which extends upwardly and forwardly over a part of the box with a portion 12 that bears against the cover portion 9 to provide a means for resiliently holding the hinge parts against the edge 8 of the opening 6. The ash receiver is thus held in any adjusted position in a secure manner and thereby eliminating rattles.

Integral with the spring tension member 11 and at its inner end is formed a snuffer 13 for extinguishing cigars and cigarettes and to facilitate the removal of ashes therefrom.

In the spring 11 at the portion 12 is cut a hole 22 and on each side of the hole a lug 23 is formed upwardly. When the box A is in closed position as in Figure 1, the lugs 23 will fit into corresponding recesses 24 formed in the cover 9 for resiliently retaining the box in closed position. A stop lug is cut away from the cover portion 9 at 10 which will enter the hole 22 in the spring 11 where the box A is tilted to open position and stop further forward movement, unless it is desired to completely remove the box A for emptying. This may be accomplished by pressing down the snuffer portion 13 of the spring 11 to release the contact of the lug 10 with the rear edge of the hole 22 in the spring 11. The box A may then be removed from the opening, the contents emptied and the box replaced by first placing the hinge parts 5 over the lower edge 8 of the opening 6 and swinging the box into place within the opening. During this movement the spring 11 will be depressed to assume its correct position.

The bottom edge and a portion of the side edges of the front wall 1 of the box A are bent outwardly to form a groove 14. The outer surface of the wall 1 and the inner surface of the groove 14 are covered with a fibrous material 15, such as leather or other similar materials. Into the groove 14 is detachably mounted a member having an ornamental front portion 16 and a mirror like rear portion 17. This member may be formed from one piece trimmed on the front face to match the instrument panel and polished on the rear face to form a mirror, but in the present embodiment I have shown a separate part 16 having an ornamental face portion with the rear portion formed to receive a mirror 17 that is removably mounted in a frame 18 by means of bent over ears 26. The mirror frame 18 is punched at several points to form small protrusions 25, sometimes called nuffins. These nuffins fit closely into the turned over edges of the panel 16 and thus the mirror and frame may be removably attached to the back of the panel 16. I have found that with this construction it is quite advantageous to provide a packing or backing for the mirror and frame as shown at 20, which may be of leather or other suitable material. To facilitate opening and closing the box A, I attach to the ornamental panel 16 a handle 21, which also serves as a handle for removing and replacing the ornamental panel 16 and mirror 17. When the box A is being opened and closed the lower portion 19 of the front wall 1 bears against the front face of the instrument panel 7 or other interior wall to serve as a pivot in cooperation with the hinge portions 5.

When the box A is removed for emptying as previously referred to the panel 16 and mirror 17 are retained from falling out by the engagement of these parts with the leather member 15 to prevent accidental displacement of the panel and mirror member. Also the member 15 serves to prevent damage to the finish on the ornamental panel or to the face of the mirror when this member is being removed from or replaced in the groove 14 on the wall 1. Removal of this member is accomplished by an upward pull on the knob 21 regardless of the position to which the box A is adjusted.

Having thus described the device shown herein, it is obvious that the decorative panel and mirror member can be easily removed from and readily replaced in the grooved portion of the front wall 1 of the ash receiver box A.

The ash receiver of this invention being made almost entirely of sheet metal parts is practical, economical to manufacture and quite useful. It should be understood that it is not desired to limit the invention to the exact details of construction and operation herein shown and described for various modifications within the scope of the claims may occur to those skilled in the art.

What I claim is:—

1. In an ash receiver of the concealed type mounted for movement within an opening in a supporting wall and having a detachable front panel, the combination which comprises an ash receiving box having a front wall, means mounted upon the front wall for engaging said detachable panel comprising a curved lip extending part way around the periphery of said front wall and forming a channel spaced from the outer surface thereof into which said detachable panel may be inserted by a sliding movement.

2. In an ash receiver of the concealed type mounted for movement within an opening in a supporting wall the combination comprising an ash receiving box having a front wall, said front wall having a channel shaped lip secured thereto and spaced from its exterior surface and extending along its bottom edge and parts of its side edges and a decorative panel having a handle attached thereto adapted to be slidably engaged in said channel shaped lip.

3. The combination of claim 2 with a packing attached to the exterior surface of said front wall and to the interior surface of said channel shaped lip and a mirror attached to the inner surface of said decorative panel.

4. A detachable ornamental front panel for an ash receiver comprising a decorative panel member, a decorative knob secured thereto and extending outwardly from the decorative surface thereof and a mirror detachably secured to the rear surface of said panel, said mirror securing means comprising a frame having an L-shaped cross section and spaced ears, said frame forming a bead around the exterior surface of said mirror when in place.

5. In an ash receiver of the concealed type, the combination of, a support, an opening in said support, an ash receptacle mounted for movement within said opening, said receptacle having a front wall, a detachable panel for said receptacle having an ornamental surface on one side, a mirror-like surface on the opposite side, means for detachably securing said panel to the front wall of said receptacle, said means comprising a rim secured to said wall adjacent a part of its periphery, said rim and the exterior surface of said wall forming a channel shaped passage outside of said receptacle into which said panel may slide as it is engaged with or removed from engagement with said wall.

JOHN VISSER.